United States Patent [19]

Nomoto et al.

[11] Patent Number: 4,739,222
[45] Date of Patent: Apr. 19, 1988

[54] COMPACT FLUORESCENT LAMP WITH A SCREW BASE

[75] Inventors: Ikuya Nomoto, Akigawa; Ichiro Torii, Tokyo; Kenji Kawabata, Ome, all of Japan

[73] Assignee: Hitachi, Ltd., Tokyo, Japan

[21] Appl. No.: 859,692

[22] Filed: May 5, 1986

[30] Foreign Application Priority Data

May 7, 1985 [JP] Japan .................................. 60-95446
Nov. 20, 1985 [JP] Japan ................................. 60-258507

[51] Int. Cl.$^4$ ............................................. H01J 61/56
[52] U.S. Cl. ........................................ 315/57; 315/50; 315/70; 313/46; 313/47; 313/238; 313/242; 313/268; 313/292; 362/218; 362/294
[58] Field of Search ..................... 315/57, 70, 50; 313/242, 238, 268, 292, 46, 47; 362/294, 218, 221

[56] References Cited

U.S. PATENT DOCUMENTS 3,987,334  10/1976  Anderson ............................... 313/46
4,096,450   6/1978  Hill et al. ............................... 313/46
4,459,506   7/1984  Beck ..................................... 313/315
4,571,526   2/1986  Wesselink ............................... 313/46

FOREIGN PATENT DOCUMENTS 0004539  2/1984  Japan .
0138842  7/1985  Japan ..................................... 313/46
0138843  7/1985  Japan ..................................... 313/46

Primary Examiner—David K. Moore
Assistant Examiner—Michael J. Nickerson
Attorney, Agent, or Firm—Antonelli, Terry & Wands

[57] ABSTRACT

A compact fluorescent lamp with a screw base having a lamp with an inner tube, an outer case which is provided at one end of the lamp and includes an operating circuit section therein and has a screw base at one end of the outer case, and a molding compound having excellent insulation and good conduction of heat which is pressed and interposed into the gap between the operating circuit section and the outer case in order to transfer the heat generated in the operating circuit section to the outer case.

11 Claims, 2 Drawing Sheets

COMPACT FLUORESCENT LAMP WITH A SCREW BASE

BACKGROUND OF THE INVENTION

The present invention relates to a compact fluorescent lamp with a screw base which is to be used in place of an incandescent lamp and, more particularly, to a heat radiation structure which is suitable for the protection of circuit elements in a high frequency electronic ballast (including an oscillator transformer) and a transistor or a FET (Field Effect Transistor), and for improvement of the reliability of the circuit elements.

The high frequency operating circuit section corresponding to such type of compact fluorescent lamp requires a sealed structure and the elements therein need to be highly compacted. In addition, since the operating circuit section is usually located above a lamp, it is subjected to the heat which is generated from the lamp. On the other hand, there are some elements, among the circuit elements contained in the compact fluorescent lamp, which are likely to be adversely influenced by this heat that is being generated. Therefore, the use of a heat radiation fin is considered one type of structure for effectively radiating the heat of the oscillator transformer, which is a heat element or source of heat in the operating circuit section to the atmosphere. Further, another way for improving the heat radiation effect is by enlarging the heat transfer area, as indicated in Japanese Utility Model Examined Publication No. 59-4539, by pouring the insulating compound into the outer case and thereby allowing the ballast (oscillator transformer) to come into contact with this compound, or by a means for enlarging the heat transfer area by molding the transformer using a heat hardened resin. In addition, there has been used the means for attaching the heat radiation fin to the transistor or FET or directly attaching the transistor or FET to the outer case.

According to the above conventional techniques, although the heat radiation effect increases, the total lamp weight also substantially increases due to the pouring of the compound. In the case of molding the transformer with the resin, the productivity decreases and the total cost in turn increases. Also, the pouring of the compound results in the structure becoming complicated, having an increased number of parts, and results in a decrease of productivity. The attachment of the heat radiation fin to the transistor or FET results in an increase in the number of required parts and in a high attachment cost. On the other hand, the method whereby the transistor or FET is directly attached to the outer case results in a very complicated assembled structure. As mentioned above, the conventional technologies have resulted in various problems.

SUMMARY OF THE INVENTION

It is therefore an object of the present invention to provide a compact fluorescent lamp with a screw base, which is low in cost, excellent in productivity, light-weight, maintaining the increase in the total weight to be as small as possible and also be highly reliable, effectively reducing the temperatures of the elements by efficiently transferring the heat generated by the transformer and the heat generated by the transistor or FET to the outer case (metal casing) due to conduction of heat.

To accomplish the above objects, a compact fluorescent lamp with a screw base according to the present invention comprises: a lamp having an inner tube; an outer case which is provided at one end of the lamp and includes an operating circuit section and has a screw base at one end of the outer case; and a molding compound having excelled insulation and good conduction of heat which is pressed and interposed into the gap between the operating circuit section and the outer case in order to transfer the heat generated in the operating circuit section to the outer case.

As a result of such construction characterizing the present invention, namely the compression and pressure contact of the molding compound such as a rubber-like molding compound, the reduction of the heat radiation effect that results from the contraction occurring with time of the compound can be suppressed. As a result, the reliability of the molding compound can be improved. The total weight can be reduced by using the minimum amount of heat conductive compound that is necessary, e.g., by pre-shaping the compound. Further, there is no need to pour the compound and then wait for it to harden the compound. Consequently, the productivity, based on the improvements that would result by using a molding compound according to the present invention, would significantly improve.

DESCRIPTION OF THE PREFERRED EMBODIMENTS

Figure 1A:
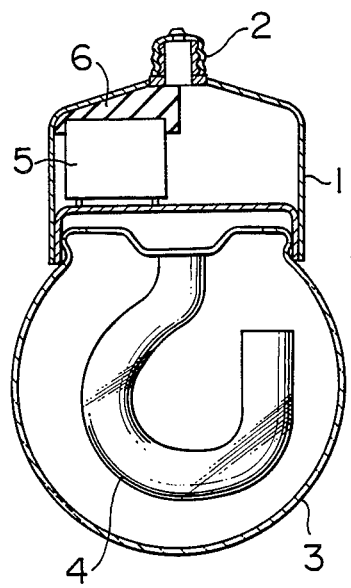
FIGS. 1A and 1B are a front cross sectional view and a side cross sectional view of a compact fluorescent lamp with a screw base according to the present invention, respectively.
Figure 1B:
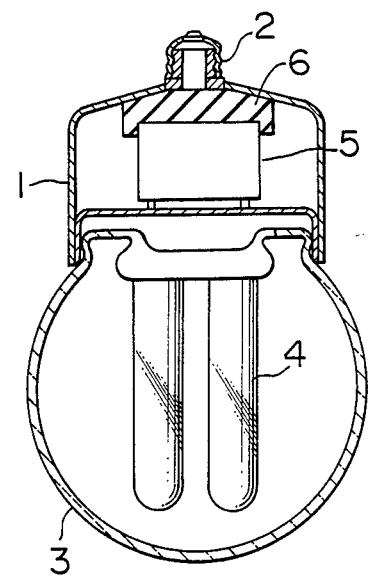

An embodiment of the present invention will now be described, hereinbelow, with reference to FIGS. 1A, 1B and 2. In these diagrams, an outer case 1 is formed of aluminum and a high frequency operating circuit is built in the outer case 1. A lamp section including an inner tube 4 and an outer bulb 3 is provided under the operating circuit section. A screw base is attached to the outer case 1. A compact fluorescent lamp with the screw base is constituted in this manner. An oscillator transformer 5 is provided in the outer case 1 in close vicinity of the outer case 1. An insulating silicon rubber molding compound 6 having excellent conduction of heat is pressed in the gap between the outer case 1 and the transformer 5.

As a result of the improved structure, the heat generation of the transformer 5 is thus transferred to the outer case 1 by the molding compound 6, thereby enabling the elements which would otherwise be weakened by the heat to be protected from the heat. Thus, there is no need for using instead the surrounding structure which would be necessary until the poured compound material becomes hardened for prevention of the outflow of the poured compound, according to the conventional compound pouring structure. Thus, the structure surface according to the present invention, can be simplified. In addition, by using rubber-like silicon with the hardness rating (JIS. A) of 30 to 50 as a compound material and pressing it into the gap between the outer case 1 and the transformer 5, the reduction of the heat conduction effect due to the contraction occurring of the molding compound 6, as time elapses, can be suppressed. Miniaturization and a light weight are realized.

Figure 2:
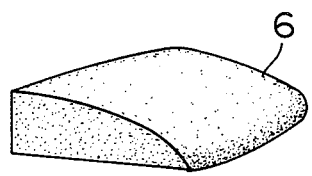
FIG. 2 is an external view of a pre-shaped molding compound.
Figure 3A:
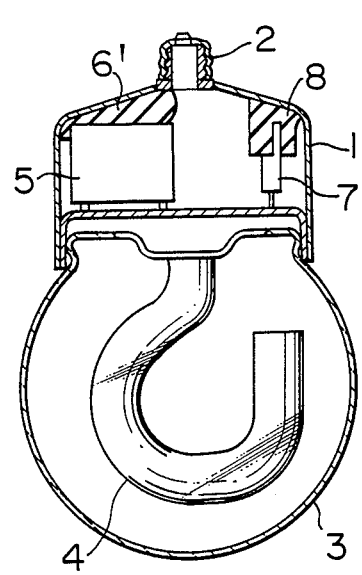
FIGS. 3A and 3B are a front cross sectional view and a side cross sectional view of another embodiment according to the invention, respectively.
Figure 3B:
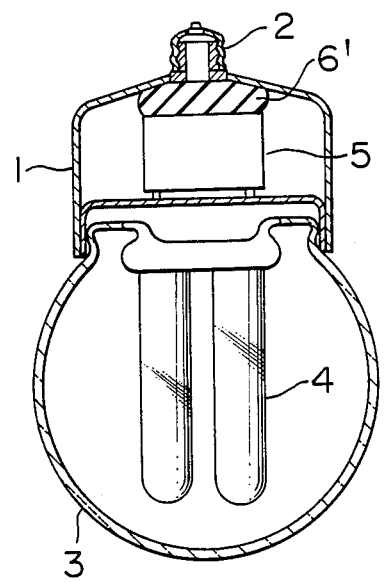
Figure 4A:
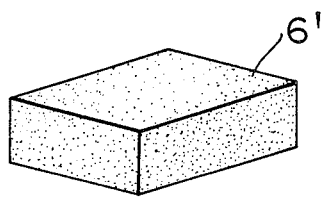
FIGS. 4A and 4B are external views of gel molding compounds that are pre-shaped, respectively.
Figure 4B:
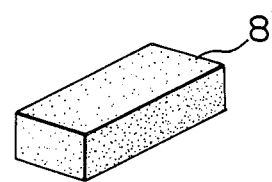

Further, it is sufficient to dispose the pre-shaped molding compound 6 of this embodiment as illustrated in FIG. 2 on the transformer 5, leading to improved productivity and efficiency.

As mentioned above, according to the embodiment, by using the molding compound 6, such as silicon rubber, the heat radiation increasing effect is obtained due to the enlargement of the heat radiation area. On the other hand, the amount of compound required is reduced to about 80% of the volume corresponding to that of the conventional example, previously discussed because of the improved heat conducting efficiency effect from the compression of the rubber, so that the light weight aspect is also realized. Also, the structure is simplified as compared with the conventional compound pouring means, so that the productivity is extremely improved and the cost is also reduced.

Another embodiment of the invention will now be described with reference to FIGS. 3A, 3B 4A and 4B. In these diagrams, the outer case 1 is formed of aluminum and a high frequency operating circuit is built therein. A lamp section including the inner tube 4 and outer bulb 3 is provided according to the illustrated embodiment, under the operating circuit. The screw base 2 is attached to the outer case 1. The compact fluorescent lamp with the screw base is constituted in this manner. The oscillator transformer 5 and a transistor or FET 7 serving as a switching element are arranged in the outer case 1 in close vicinity of the outer case 1. Insulating silicon gel molding compounds 6′ and 8 having excellent conduction of heat are pressed into the gap between the outer case 1 and the transformer 5 and into the gap between the outer case 1 and the transistor or FET 7.

With such a structure, the generated heat of the transformer 5 and transistor or FET 7 is transferred to the outer case 1 by the molding compounds 6′ and 8, respectively thereby enabling the elements which are sensitive to the heat to be protected.

Thus, the surrounding structure necessary until the compound is hardened for preventing the outflow of the compound, which structure has been needed in the conventional compound pouring structure, becomes unnecessary, thereby allowing the structure to be simplified. In addition, in the case of the previous embodiment of the present invention using the rubber with the hardness rating (JIS. A) of 30 to 50, the silicon molding compound must be molded in accordance with the shape of the transformer or transistor. But, by alternatively using gel silicon material, e.g. silicon rubber gel, the gel silicon material is arbitrarily deformed during assembly. Therefore, the pre-shaping of the molding compound is simplified as, for example, shown in FIG. 4A or 4B. In addition, since the gel compound is pressed, the reduction of the heat conduction effect resulting from the contraction occurring with the elapse of time and decrease in weight and the like can be suppressed and the small size and light weight are realized. Moreover, it is sufficient to just dispose or press into place the molding compounds 6′ and 8 in the embodiment on the transformer 5 and transistor or FET 7 during the time of assembly of the compact fluorescent lamp thereby resulting in improved productivity and efficiency.

As described above, according to this embodiment, by using rubber like gel silicon molding compounds 6′ and 8 which have high heat conductivity, the heat radiation effect is enhanced because of the enlargement of the heat radiation area. By using such a compound compressible material which has high conduction of heat characteristics, the volume of compound which is necessary can be reduced to ½ and the weight can be decreased to ⅔ as compared with that in the conventional example, so that a compact fluorescent lamp of light weight is realized. Also, according to the present invention, the structure is simplified as compared with that of the conventional compound pouring means thereby resulting in improved productivity and reduced cost.

We claim:

1. A compact fluorescent lamp with a screw base comprising:
    a lamp having an inner tube;
    an outer case which is provided at one end of said lamp and includes an operating circuit section therein and has a screw base at one end of said outer case;
    a pre-shaped molding compound element having excellent insulation and good conduction of heat which is pressed and interposed into a gap between said operating circuit section and said outer case in order to transfer the heat generated in said operating circuit section, when active to said outer case.

2. A compact fluorescent lamp according to claim 1, wherein said operating circuit section includes a high frequency oscillator transformer, and said pre-shaped molding compound element is pressed and interposed into the gap between said transformer and said outer case.

3. A compact fluorescent lamp according to claim 2, wherein said pre-shaped molding compound element includes silicon rubber compound.

4. A compact fluorescent lamp according to claim 2, wherein said pre-shaped molding compound element includes silicon rubber gel compound.

5. A compact fluorescent lamp according to claim 1, wherein said operating circuit section includes a high frequency oscillator transformer and a switching element, and said pre-shaped molding compound element is pressed and interposed into the gap between said transformer and said outer case and into the gap between said switching element and said outer case, respectively.

6. A compact fluorescent lamp according to claim 5, wherein said pre-shaped molding compound element includes silicon rubber compound.

7. A compact fluorescent lamp according to claim 5, wherein said pre-shaped molding compound element includes silicon rubber gel compound.

8. A compact fluorescent lamp according to claim 1, wherein said pre-shaped molding compound element includes silicon rubber compound.

9. A compact fluorescent lamp according to claim 1, wherein said pre-shaped molding compound element includes silicon rubber gel compound.

10. A compact fluorescent lamp having a screw-type of threaded base comprising:
    a lamp including an inner tube;
    an outer case which is provided at one end of said lamp includes an operating circuit means therein and has a screw-type of threaded base shape at an end of said outer case, other than the lamp connecting end; and a silicon rubber gel type compound element that is pre-shaped, having excellent insulation and good conduction of heat characteristics, is pressed and interposed into a gap between said operating circuit means and said outer case in order to transfer the heat generated in said operating circuit means, when active, to said outer case.

11. In a compact fluorescent lamp including a lamp having an inner tube and an outer case which is provided at one end of said lamp and which has an operating circuit means therein and a screw-type of threaded base shape at an end thereof, other than the lamp connecting end, wherein the improvement comprises:

a molding compound element that is pre-shaped, having excellent insulation and good conduction of heat characteristics, is pressed and interposed into a gap between said operating circuit means and said outer case in order to transfer the heat generated in said operating circuit means, when active, to said outer case.

* * * * *